US009867053B2

(12) United States Patent
Prasad et al.

(10) Patent No.: US 9,867,053 B2
(45) Date of Patent: Jan. 9, 2018

(54) COEXISTENCE OF LTE-U WITH WIFI AND/OR ANOTHER LTE-U SYSTEM IN UNLICENSED SPECTRUM

(71) Applicant: Verizon Patent and Licensing Inc., Arlington, VA (US)

(72) Inventors: Abhinav Prasad, Edison, NJ (US); Siva Sandeep Dhandu, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 136 days.

(21) Appl. No.: 14/630,600

(22) Filed: Feb. 24, 2015

(65) Prior Publication Data

US 2016/0249224 A1    Aug. 25, 2016

(51) Int. Cl.
*H04J 3/24* (2006.01)
*H04W 72/00* (2009.01)
*H04W 16/14* (2009.01)
*H04W 72/08* (2009.01)
*H04W 72/04* (2009.01)

(52) U.S. Cl.
CPC ......... *H04W 16/14* (2013.01); *H04W 72/085* (2013.01); *H04W 72/0453* (2013.01)

(58) Field of Classification Search
CPC ...... H04W 16/14; H04W 16/16; H04W 16/18

USPC ............... 370/473, 474; 455/452.1
See application file for complete search history.

(56) References Cited

U.S. PATENT DOCUMENTS

2014/0044105 A1* 2/2014 Bontu ............... H04L 5/001
    370/336
2015/0223077 A1* 8/2015 Fan ................. H04W 16/14
    370/312

OTHER PUBLICATIONS

Qualcomm Incorporated Whitepaper, "Extending LTE Advanced to unlicensed Spectrum," Dec. 2013, Obtained from the Internet link: https://www.qualcomm.com/documents/white-paper-extending-lte-advanced-unlicensed-spectrum.

* cited by examiner

*Primary Examiner* — Joshua Schwartz

(57) ABSTRACT

Techniques are described that provide for the collaborative co-existence of LTE-U base stations and access points associated with technologies, such as WiFi, that use unlicensed frequency spectrum. In one implementation, a LTE-U device may select a frequency block, in an unlicensed frequency spectrum, based on measured signal strengths and decoded Master Information Blocks (MIBs) that are broadcast in the unlicensed frequency spectrum. The LTE-U device may initiate communications via the selected frequency block by transmitting a MIB that includes a token identifier field that identifies the selected frequency block.

20 Claims, 9 Drawing Sheets

COEXISTENCE OF LTE-U WITH WIFI AND/OR ANOTHER LTE-U SYSTEM IN UNLICENSED SPECTRUM

BACKGROUND

Long-Term Evolution (LTE) is a standard for wireless communication of high-speed data for mobile phones and data terminals. It is based on the Global System for Mobile Communications (GSM)/Enhanced Data Rates for GSM (EDGE) and Universal Mobile Telecommunications System (UMTS)/High Speed Packet Access (HSPA) network technologies, but increasing the capacity and speed using a different radio interface together with core network improvements.

LTE Advanced in unlicensed spectrum (LTE-U) refers to a proposal to deliver LTE with small cells using unlicensed (e.g., 5 GHz) spectrum. LTE-U devices may wirelessly transmit and receive data using unlicensed and/or licensed spectrum. By tapping into the spectrum resources of the unlicensed bands, network operators may potentially obtain greater throughput and user satisfaction.

Unlike the use of licensed spectrum, however, with the use of unlicensed spectrum, the unlicensed spectrum resources may need to be simultaneously shared with multiple network operators and with traditional network access points (e.g., WiFi APs) that use the unlicensed spectrum. For example, an LTE-U system that uses the 5 GHz unlicensed spectrum may need to coexist with LTE-U base stations associated with other carriers and with traditional WiFi access points.

DETAILED DESCRIPTION OF PREFERRED EMBODIMENTS

Figure 1:
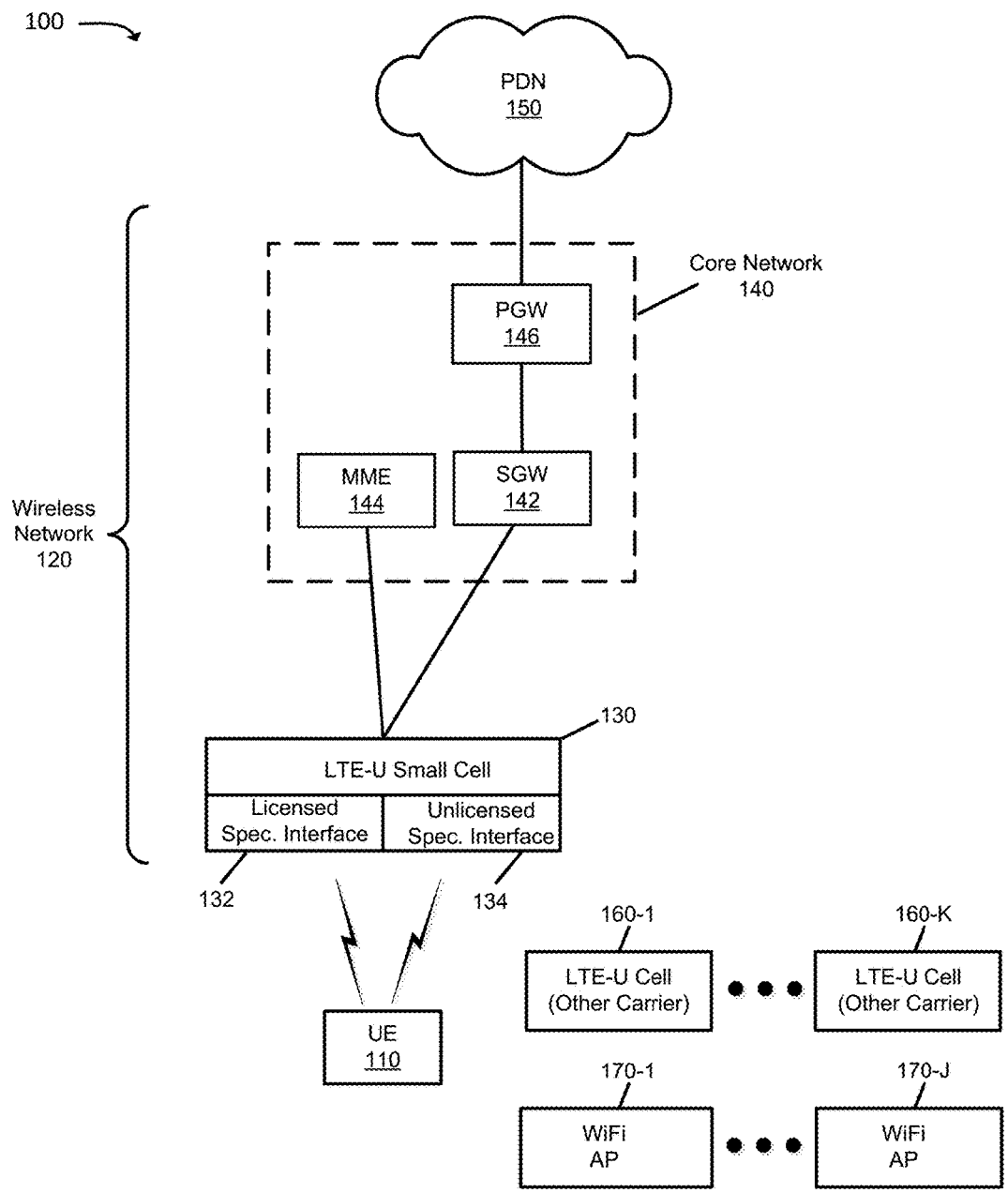
FIG. 1 is a diagram illustrating an example environment in which systems and/or methods described herein may be implemented.

The following detailed description refers to the accompanying drawings. The same reference numbers in different drawings may identify the same or similar elements.

Techniques described herein may provide for the collaborative co-existence of LTE-U base stations and access points associated with technologies, such as WiFi, that use unlicensed frequency spectrum. The LTE-U base stations may be base stations associated with different carriers. The collaborative techniques may provide for a protocol for arbitrating the unlicensed spectrum in a manner that results in fair allocation of the unlicensed spectrum.

In one implementation, an LTE-U base station may provide access to a wireless cellular network using both licensed and unlicensed spectrum. For instance, the LTE-U base station may include a first radio interface to implement a network cell using licensed spectrum and a second radio interface to implement a network cell using unlicensed spectrum. Mobile phones and data terminals, called User Equipment (UE) herein, may access the network using the radio interfaces for the licensed and/or unlicensed radio interfaces. The LTE-U base station may also include a receive (Rx) measurement module that is capable of measuring properties relating to the radio signals in the unlicensed and licensed spectrum (e.g., signal strength) as well as receiving signaling data, such as frame control information, that is encoded as part of LTE-U transmissions in the licensed and unlicensed spectrum. Based on the information received by the Rx measurement module, LTE-U base station may make usage determinations relating to the unlicensed spectrum (e.g., whether to use the unlicensed spectrum, a particular frequency block or blocks to use within the unlicensed spectrum, etc.).

The term "licensed spectrum," as used herein, may refer to the spectrum of radio frequencies that can only be used with a license from a controlling government entity. Licensed radio spectrum is typically used by network operators to provider geographically comprehensive cellular wireless networks, which may be referred to as Wireless Wide Area Networks (WWANs). Base stations in wireless networks implemented with licensed spectrum may be composed of relatively large "cells" that each provide coverage to a particular area. Because network providers may have exclusive control over the use of a particular licensed frequency band, communications conducted over licensed spectrum may generally be more reliable and predictable than communications conducted over unlicensed spectrum.

The term "unlicensed spectrum," as used herein, may refer to the spectrum of radio frequencies that can used without a license from a controlling government entity. Wireless Local Area Network (WLANs) are typically implemented using unlicensed radio spectrum. Examples of radio technologies that can be used to implement a WLAN, using unlicensed spectrum, are the WiFi (i.e., using Institute of Electrical and Electronics Engineers (IEEE) 802.11-based standards) standards and the Bluetooth® wireless standards. In the examples discussed herein, unlicensed spectrum will refer to typical WiFi frequency bands. It can be appreciated, however, that in other implementations, other frequency bands could alternatively or additionally be used.

FIG. 1 is a diagram illustrating an example environment 100 in which systems and/or methods described herein may be implemented. As illustrated, environment 100 may include user equipment (UE) 110, which may obtain network connectivity from a wireless network 120. Although a single UE 110 is shown for simplicity in FIG. 1, in practice, multiple UEs 110 may operate in the context of wireless network 120. Wireless network 120 may include a number of base stations or other wireless access points. For example, wireless network 120 may include LTE-U small cell 130, which may connect to core network 140. Although only LTE-U small cell 130 is shown, in FIG. 1, as connecting to core network 140, in general, a number of other macro cells and/or small cells may connect to core network 140. A macro cell and/or small cell may be physically provided by a base station, which, in the context of LTE, may be referred to as an evolved Node B (eNB).

Wireless network 120 may provide access to one or more external networks, such as packet data network (PDN) 150. Additionally, a number of other LTE-U cells 160-1 to 160-K (where K is an integer >=1) and a number of WiFi access points (APs) 170-1 to 170-J (where J is an integer >=1) may exist in physical proximity to UE 110 and/or to LTE-U small cell 130. LTE-U cells 160 may represent wireless cells operated by network providers (carriers) other than the network provider that maintains LTE-U small cell 130. Because the unlicensed spectrum used by LTE-U cells 160 and the unlicensed spectrum used by LTE-U small cell 130 may correspond to the same unlicensed spectrum, interference may occur. Similarly, WiFi APs 170 may use the same unlicensed spectrum as that used by LTE-U small cell 130, and interference may thus potentially occur. As will be described more detail below, LTE-U small cell 130 may implement protocols to minimize interference in the unlicensed spectrum and provide WiFi APs 170 the opportunity to function normally without requiring changes to WiFi APs 170.

UE 110 may include a portable computing and communication device, such as a personal digital assistant (PDA), a smart phone, a cellular phone, a laptop computer with connectivity to a cellular wireless network, a tablet computer, etc. UE 110 may also include non-portable computing devices, such as desktop computers, consumer or business appliances, or other devices that have the ability to wirelessly connect to wireless network 120.

LTE-U small cell 130 may represent a base station, such as an eNB, a remote radio head associated with a base station, or another device that implements wireless cells that can be used to access core network 140. A "small cell" may generally refer to a femtocell, picocell, and/or microcell, which may generate a small (e.g., tens of meters up to one or two kilo-meters) radio footprint. Small cells may be used by network providers to extend the coverage area and/or increase network capacity provided by traditional macro-cells. Although labeled as a small cell in FIG. 1, LTE-U small cell 130 may alternatively correspond to a macrocell.

LTE-U small cell 130 may be part of a 3GPP ($3^{rd}$ Generation Partnership Project) access network that includes multiple access technologies, such as an access technology using licensed frequency spectrum and an access technology using unlicensed frequency spectrum. The access technology using licensed frequency spectrum is illustrated as Licensed Spectrum Interface 132 and the access technology using unlicensed frequency spectrum is illustrated as Unlicensed Spectrum Interface 134. Both Licensed Spectrum Interface 132 and Unlicensed Spectrum Interface 134 may use 3GPP LTE communication protocols. For example, LTE-U small cell 130 may be part of a radio access network (RAN) that includes an evolved packet system (EPS) that includes a LTE network that operates based on a 3GPP wireless communication standard.

Core network 140 may include an IP-based network. In the 3GPP network architecture, core network 140 may include an Evolved Packet Core (EPC). As illustrated, core network 140 may include serving gateway (SGW) 142, Mobility Management Entity (MME) 144, and packet data network gateway (PGW) 146.

SGW 142 may include one or more network devices that aggregate traffic received from LTE-U small cell 130 and/or from other devices associated with small cells or macrocells. SGW 142 may generally handle user (data) plane traffic. MME 144 may include one or more computation and communication devices that perform operations to register UE 110 with core network 140, establish bearer channels associated with a session with UE 110, hand off UE 110 from one cell or eNB to another, and/or perform other operations. MME 144 may generally handle control plane traffic. SGW 142 may include one or more network devices that aggregate traffic received from one or more LTE-U small cells 130. SGW 142 may generally handle user (data) plane traffic.

PGW 146 may include one or more devices that act as the point of interconnect between core network 140 and external IP networks, such as PDN 150, and/or operator IP services. PGW 146 may route packets to and from the access networks and the external IP networks.

PDN 150 may include a packet-based network. PDN 150 may include external networks, such as a public network (e.g., the Internet) or proprietary networks that provide services that are provided by the operator of core network 140 (e.g., IP multimedia (IMS)-based services, transparent end-to-end packet-switched streaming services (PSSs), or other services).

The quantity of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1. Alternatively, or additionally, one or more of the devices of environment 100 may perform one or more functions described as being performed by another one or more of the devices of environment 100.

Figure 2:
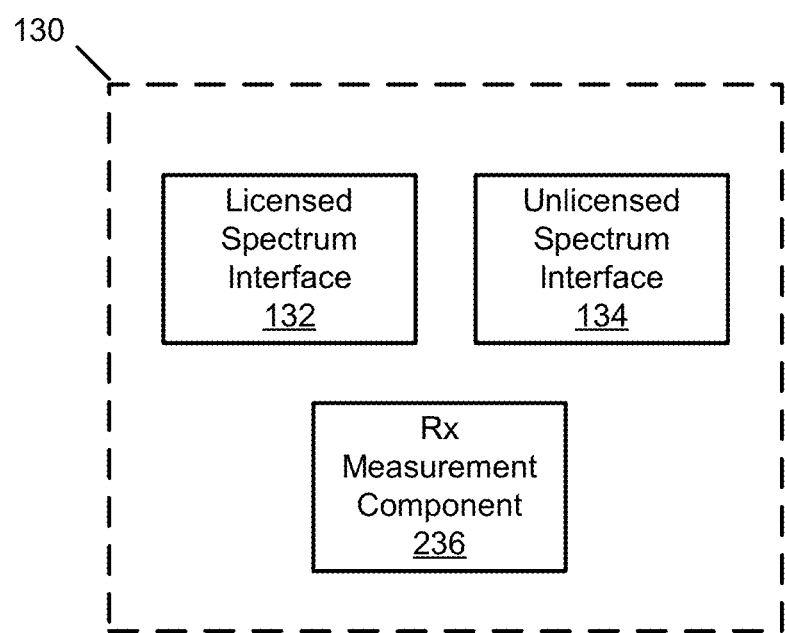
FIG. 2 is a block diagram conceptually illustrating an example of components that may be included within a LTE-U small cell.

FIG. 2 is a block diagram conceptually illustrating an example of components that may be included within LTE-U small cell 130. As shown, LTE-U small cell 130 may include licensed spectrum interface 132, unlicensed spectrum interface 134, and receive (Rx) measurement component 236.

Licensed spectrum interface 132, as previously discussed with respect to FIG. 1, may include one or more radios, antennas, and/or other circuitry associated with creating a radio link (i.e., an air interface) using licensed frequency spectrum. Similarly, unlicensed spectrum interface 134 may include one or more radios, antennas, and/or other circuitry associated with creating a radio link (i.e., an air interface) using unlicensed frequency spectrum.

Rx measurement component 236 may include logic to measure downlink communications associated with the licensed and/or licensed frequency bands corresponding to LTE-U cells 160 and WiFi APs 170. Rx measurement component 236 may, for example, measure signal strength/quality of radio signals transmitted by LTE-U cells 160 and/or WiFi APs 160. The signal strength measurements may include, for example, the carrier Receive Strength Signal Indicator (RSSI), which may relate to the average total received power observed in Orthogonal Frequency-Division Multiplexing (OFDM) symbols; the Reference Signal Received Quality (RSRQ), which may relate to a quality based on RSSI and also based on the number of used resource blocks; WiFi signal strength for WiFi links; or other measures of signal strength.

Rx measurement component 236 may also include logic to, for unlicensed or licensed spectrum LTE communications (e.g., communications from LTE-U cells 160), decode the LTE Master Information Block (MIB). In LTE, the MIB may be the first information block that is broadcasted by an eNB (e.g., associated with LTE-U cell 160) as part of the LTE System Information Blocks (SIBs). The MIB may be a 24-bit block and may be transmitted using the PBCH (Physical Broadcast Channel) in the downlink. The MIB may include, among other fields, fields for storing system bandwidth and system frame number. In some implementations, Rx measurement component 236 may additionally determine whether, for a particular frequency block, there is no decodable MIB, which may indicate that the particular frequency block is free.

In some implementations, Rx measurement component 236 may include logic to filter measurements based on the transmitting cell. For example, a first neighboring cell may be associated with the same network provider that controls LTE-U small cell 130. Accordingly, information relating to this cell may be communicated through wired control channels of wireless network 120, and thus it may not be desirable or needed for Rx measurement component 236 to obtain measurements relating to this cell. A second neighboring cell, however, may be associated with a different network provider, and hence it may be desirable for Rx measurement component 236 to monitor this cell.

The unlicensed spectrum may be divided into frequency blocks. The bandwidth division of the blocks is configurable by LTE-U small cell 130 and may be configured based on, for example, the Quality of Service (QoS) desired. Consistent with aspects described herein, the blocks may be mapped to an identification value, called a "token ID" ($T_1 \ldots T_N$). For example, assume the unlicensed spectrum covers 240 megahertz (MHz). This spectrum may be divided into 12 blocks of 20 Mhz each, thus requiring 12 tokens.

Figure 3A:
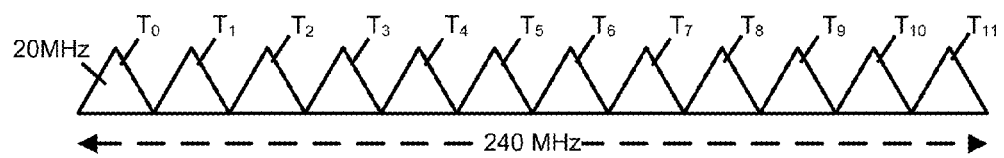
FIGS. 3A and 3B are diagrams illustrating an example of the division of unlicensed spectrum into blocks and the assignment of token identifiers to the blocks.
Figure 3B:
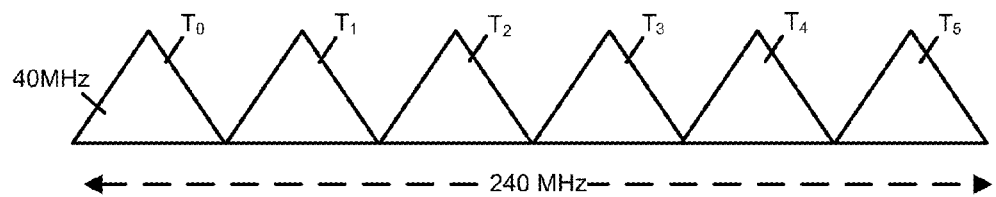

FIGS. 3A and 3B are diagrams illustrating an example of the division of unlicensed spectrum into blocks and the assignment of token IDs to the blocks. In FIGS. 3A and 3B, assume that the total bandwidth of the unlicensed spectrum is 240 MHz.

As shown in FIG. 3A, LTE-U small cell 130 has determined to divide the spectrum in to 12 blocks of 20 MHz. The frequency blocks may correspond to the twelve token IDs $T_0$ through $T_{11}$. As shown in FIG. 3B, LTE-U small cell 130 has determined to divide the spectrum in to 6 blocks of 40 MHz. The frequency blocks may correspond to the six token IDs $T_0$ through $T_5$. In some implementations, the frequency block size (e.g., 20 MHz or 40 MHz) may be constant across all LTE-U cells of a particular operator or across multiple operators. Alternatively or additionally, LTE-U small cell 130 may broadcast the frequency block size to other cells, such as LTE-U cells 160.

Figure 4:
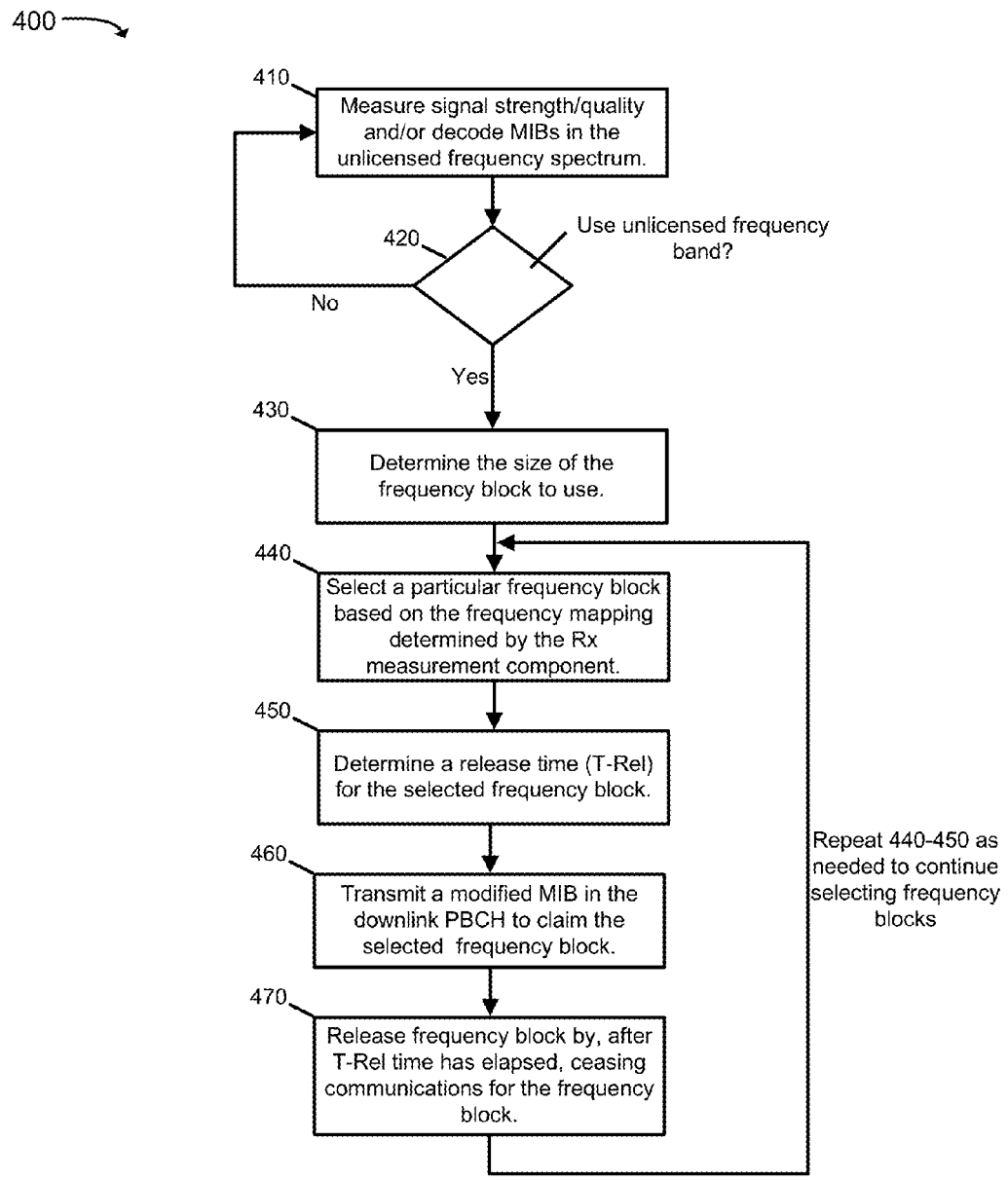
FIG. 4 is a flowchart illustrating an example process relating to using unlicensed spectrum in an LTE-system.

FIG. 4 is a flowchart illustrating an example process 400 relating to using unlicensed spectrum in an LTE-system. Process 400 may be perform by, for example, LTE-U small cell 130.

Process 400 may include measuring the signal strength quality and/or decoding MIBs in the unlicensed frequency spectrum (block 410). As previously discussed, Rx measurement component 236 may scan the unlicensed frequency spectrum to obtain information relating to users of the spectrum by LTE-U cell 160 and/or by WiFi APs 160. The information may include signal strength/quality measurements, such as RSSI values, RSRQ values, or WiFi signal strength values. The information may also include, for unlicensed spectrum LTE-U communications, associated with LTE-U cells 160, decoded MIBs for frequency blocks that are being used by other LTE-U cells 160. In this manner, the information determined by Rx measurement component 236 may correspond to a mapping of the current usage of the unlicensed spectrum in the vicinity of LTE-U small cell 130.

Process 400 may further include determining whether to use the unlicensed frequency spectrum (block 420). LTE-U small cell 130 make the determination of whether to use the unlicensed frequency spectrum based on a number of factors, such as the current loading of the licensed frequency spectrum, the current loading of the unlicensed frequency spectrum (e.g., based on the mapping determined by Rx measurement component 236), the current QoS requirements of UEs 110, and/or other factors. In some implementations, the decision of whether to use the unlicensed frequency spectrum may be determined by or influenced by the network devices associated with core network 140 and/or by requests from UEs 110.

When the unlicensed frequency band is to be used (block 420—Yes), process 400 may include determining the size (bandwidth) of the unlicensed frequency block to use (block 430). In one implementation, the size of the frequency block may be based on QoS requirements of the UEs (or the particular application(s) that are to use the frequency block) and/or based on the current loading of the unlicensed spectrum. For example, for an application service type, such as voice, for which the QoS corresponds to relatively low latency and low bit rate requirements, a 5 Mhz frequency block may be adequate. For another application service type, such as video, 20 or 40 MHz frequency blocks may be needed.

In some implementations, the frequency block size may be a constant block size that is set by an administrator or by core network 140. Alternatively or additionally, LTE-U small cell 130 may broadcast, such as though system information messages, the frequency block size, to other LTE-U cells 160. Other information or parameters may also potentially be broadcast to LTE-U cells 160 to aid in cooperative scheduling.

Process 400 may further include selecting a particular frequency block based on the frequency mapping determined by the Rx measurement component (block 440). A selected frequency block may also be referred to as a communication "channel" herein. Selection of the particular frequency block may be based on the desire to minimize interference with other LTE-U cells 160 and/or with WiFi APs 170. For example, LTE-U small cell 130 may select a frequency block based on the criteria that the selected frequency block is not in use by another LTE-U cell 160 (i.e., Rx measurement component 236 has not been able to decode a MIB corresponding to the frequency block) and in which the signal strength/quality measurement from the frequency block is below a threshold. As another example, LTE-U small cell 130 may select a frequency block as the frequency block that has the lowest measured signal strength/quality value (i.e., the lowest level of interference) and that is not in use by another LTE-U cell 160.

Process 400 may further include determining a release time, referred to as T-Rel herein, for the selected frequency block (block 450). T-Rel may correspond to a time period for which the selected frequency block is to be used by LTE-U small cell 130. At the expiration of T-Rel, the frequency block may be released and potentially acquired/used by another LTE-U cell 160 or by WiFi AP 170. T-Rel may be determined based on QoS requirements. For example, a high bandwidth application, such as streaming video, may use a larger T-Rel (for a given frequency block size) than a lower bandwidth application, such as voice. By using T-Rel, fair usage of the frequency blocks may be enforced. For example, if a WiFi AP 170 that is using a particular channel that corresponds to or overlaps with a portion of a selected frequency block, releasing a block after T-Rel may result in at least some "open" time for the frequency block.

Process 400 may further include using the selected frequency block by transmitting MIB(s) in the downlink PBCH to claim the selected frequency block (block 460). The transmitted MIB may be modified in relative to a conventional 3GPP MIB. Table I, below, indicates fields in the MIB, as instructed consistent with aspects described herein. In Table I, bold font indicates fields that are changed relative to a conventional MIB. As illustrated, in the modified MIB, four bits may be allocated to carry the token ID. In a conventional MID, ten bits are allocated for future use. Because of the four bits allocated to carry the token ID, in the modified MIB, six bits may be allocated to be reserved for future use.

TABLE I

| SIZE | DESCRIPTION |
| --- | --- |
| 3 bits | System Bandwidth |
| 4 bits | Token ID |
| 3 bits | PHICH (Physical Hybrid-ARQ Indicator Channel) [1 bit to indicate normal or extended PHICH; 2 bits to indicate PHICH Ng value] |
| 8 bits | System Frame Number |
| 6 bits | Reserved for future use |

Process 400 may further include releasing the frequency block by, after T-Rel time has elapsed, ceasing communications for the frequency block (block 470). In this manner, the Rx measurement component of another LTE-U cell may detect the lack of a MIB being transmitted on the particular frequency block and may thus potentially obtain control of the frequency block. Blocks 440-470 may be repeated by LTE-U small cell 130, as necessary, to continue to provide services using the unlicensed frequency spectrum.

In some implementations, LTE-U small cell 130 may transmit control and/or configuration information that relates to the unlicensed frequency spectrum, to UE 110, via the licensed frequency spectrum. For example, Radio Resource Control (RRC) communications may be used to coordinate communications, over the unlicensed frequency spectrum, with UE 110.

Figure 5:
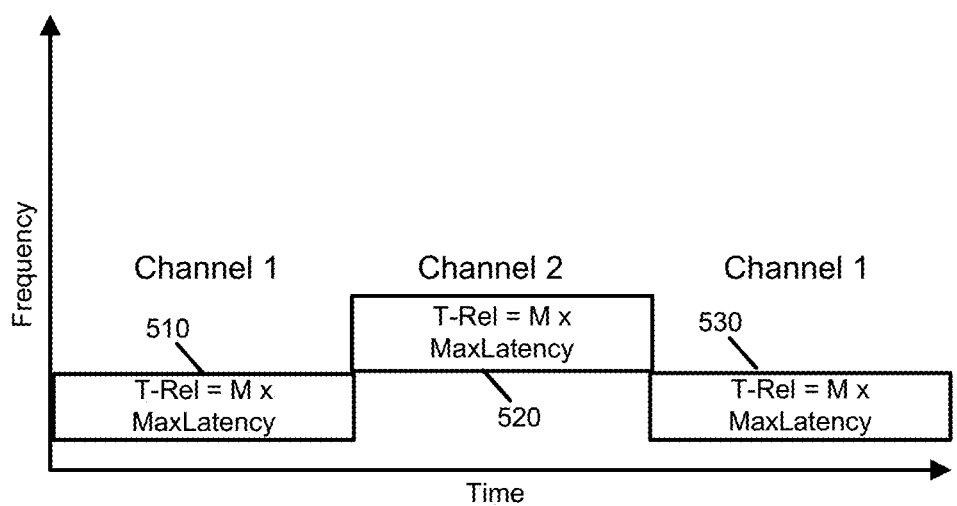
FIG. 5 is a diagram illustrating an example of selection of different frequency blocks.

FIG. 5 is a diagram illustrating an example of selection of different frequency blocks (i.e., communication channels).

In one implementation, T-Rel may be determined based on QoS considerations. For example, a buffer size, for video, may be determined, based on human perceived latency, to desirably be at least 100 milli-seconds (ms). T-Rel may be set at a value that guarantees at least twice the buffer size of data will be transmitted for each release of the selected frequency block (e.g., T-Rel may be set at M*100 ms, where M is an integer greater than or equal to two). In FIG. 5, this is illustrated by the three selected frequency blocks 510, 520, and 530. Each frequency block may have a length (in time) of M*MaxLatency (e.g., M=2 and MaxLatency=100 ms). As shown, frequency block 510 may correspond to the frequency range of a first channel (channel 1), frequency block 520 may correspond to the frequency range of a second channel (channel 2), and frequency block 530 may correspond to the frequency range of the first channel. Thus, in this example, the unlicensed frequency block corresponding to channel 1 may be used for a particular time (T-Rel) and then released. At that point, the unlicensed frequency block corresponding to channel 2 may be used for T-Rel and then released, followed by again using the unlicensed frequency block corresponding to channel 1. In this manner, a continuous logical channel may be maintained for communicating the data (e.g., streaming video) while allowing other LTE-U cells and WiFi APs to contend for the channel.

In some situations, it may be desirable for the UEs, such as UE 110, to assist in the selection of the LTE-U unlicensed frequency bands by providing assistance information to LTE-U small cell 130. For example, UE 110 may also measure and/or record signal strength/quality values of one or more of the unlicensed frequency bands. This information may be reported to LTE-U small cell 130 (or to other cells). LTE-U small cell 130 may use the information, reported by UE 110, when selecting a particular frequency block. Additionally, UE 110 may, at various times, be in a position to receive frame control information (e.g., the MIBs) transmitted by different cells associated with the same or different network operators. UE 110 may store indications of the token IDs used by the different cells and may report the used token IDs to the cell to which UE 110 is connected. The indication of the used token IDs may aid in the path selection of a free unlicensed block.

In some implementations, LTE-U small cell 130 may configure UE 110 to actively report signal strength/quality values (e.g., RSRP/RSRQ values) and/or used token IDs. The configuration may be performed over an RRC connection and reports, from UE 110 to LTE-U small cell 130, may be transmitted when UE 110 is in IDLE or CONNECTED mode. The frequency of the report may additionally be configurable by LTE-U small cell 130. The report itself may be transmitted by UE 110, to LTE-U small cell 130, via, for example, the PHY (physical) layer or another layer.

In some implementations, the report may include a "sticky bit factor" for a particular frequency block, that provides an indication as the historical usage of the frequency block. For example, the sticky bit factor may be defined to be in the range of one to four, where a value of one indicates a little used or unused frequency block, and a value of four indicates a significantly used or heavily used frequency block.

Figure 6:
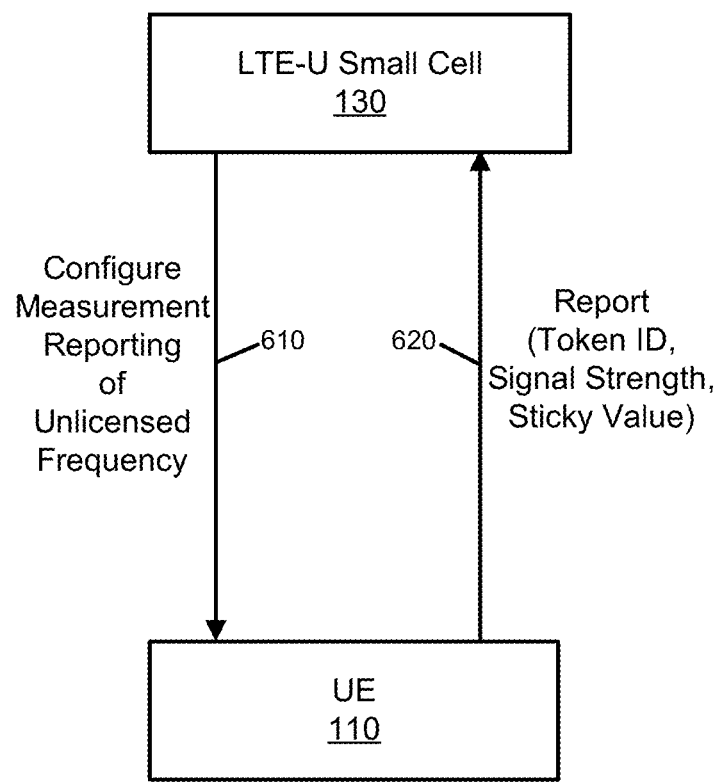
FIG. 6 is a diagram illustrating an example of UE assisted reporting.

FIG. 6 is a diagram illustrating an example of UE assisted reporting. As shown, LTE-U small cell 130 may configure UE 110, such as via RRC communications performed over the licensed frequency band, to begin reporting information that may be useful to LTE-U small cell 130 when selecting a particular unlicensed frequency block (at 610). The configuration of the measurement reporting may also include, for example, desired indication of the frequency of the reports, types of data/measurements that are to be included in the reports, or other information. In response, UE 110 may begin to measure information relevant for the requested reports. As previously mentioned, the information may include an indication of the token IDs used by a number of cells, an indication of signal strength/quality relating to the unlicensed frequency spectrum, the sticky bit factor, or other information. UE 110 may transmit the report, periodically or intermittently, to LTE-U small cell 130 (at 620). The report may be transmitted via the unlicensed or the licensed frequency spectrum.

Figure 7:
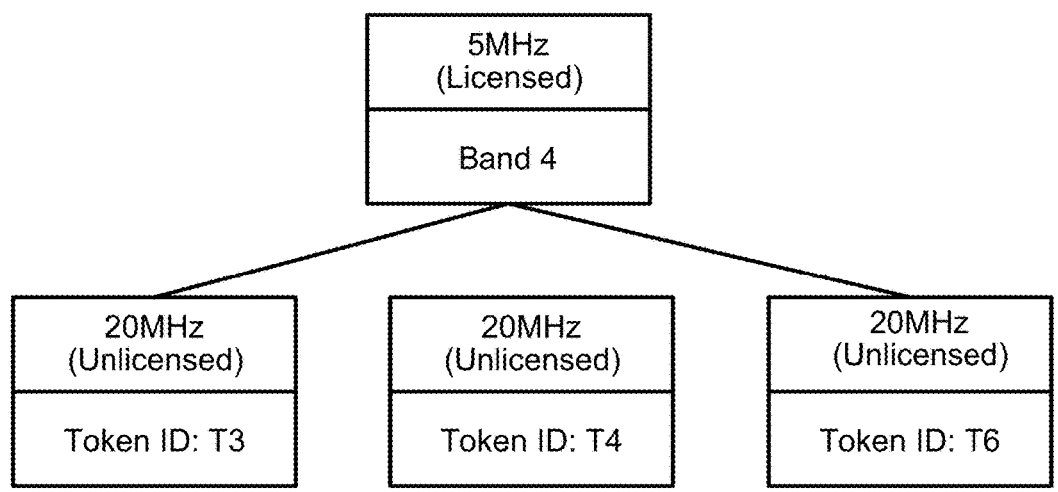
FIG. 7 is a diagram illustrating the use of multiple unlicensed frequency bands by an LTE-U small cell.

LTE-U small cell 130 may potentially make simultaneous use of multiple unlicensed frequency bands. FIG. 7 is a diagram illustrating the use of multiple unlicensed frequency bands by LTE-U small cell 130. As shown, assume LTE-U small cell 130 is using a 5 Mhz frequency band in the licensed spectrum (at 710). Additionally, in FIG. 7, three unlicensed frequency bands are illustrated, labeled as the bands having the token IDs: T3, T4, T6. Each of the unlicensed frequency bands may be 20 MHz bands. The frequency bands corresponding to T3 and T6 may be in use by LTE-U small cell 130 (e.g., frequency band T3 may be assigned to one UE and frequency band T6 may be assigned to another UE). Frequency band T4 may be free (i.e., currently not used).

Two or more LTE-U small cells 130 may, at various times, attempt to simultaneously (or nearly simultaneously) acquire the same token ID (e.g., the same frequency band).

In one implementation, LTE-U small cell 130 may detect the collision in acquiring the same token IDs by either detecting mismatched System Frame Numbers (SFNs) in the LTE System Information Broadcast message or detecting high levels of interference in the selected frequency band. In this situation, LTE-U small cells 130 may release (i.e., stop transmitting) for a random period, R. Because the values of R will be different for the two LTE-U small cells 130, the LTE-U small cell 130 that has the lower R value will be the first one that attempts to reacquire the frequency band and the other LTE-U small cell 130 should thus detect that the frequency band is no longer free and select a new frequency band. In one implementation, the value R may be selected as a random integer in a predetermined range, where the value of R may be interpreted as a number of milli-seconds (or other unit of time).

In LTE, a UE 110 may be configured with a Discontinuous Reception (DRX) cycle. A DRX cycle may include of an "On Duration" during which the UE will monitor the PDCCH and a "DRX period" ("Off Duration") during which the UE will skip reception of downlink channels. LTE-U small cell 130 may use a DRX cycle that is long enough for WiFi AP 170 or other systems to detect collision and begin transmitting. The DRX cycle may offer fair sharing of spectrum with WiFi APs. In one implementation, the DRX cycle may only be used when Rx measurement component 236 detects the operation of WiFi APs. For example, when a WiFi AP is not detected (e.g., not detected as operating in a particular frequency block), the DRX cycle may be set to zero (off) or DRX processing may be omitted. In some implementations, measurements from Rx measurement component 236 may be used to assist in setting appropriate values for the DRX cycle. For example, the DRX cycle may be set to a relatively higher value (i.e., causing more "off" periods) when multiple WiFi APs are detected as being active for a particular area but set to a relatively lower value when WiFi activity for the area is not active or is less active. The DRX cycle, in addition to benefiting WiFi APs, may also assist other LTE-U cells in obtaining control of the unlicensed frequency spectrum. In some implementations, LTE-U small cell 130 may broadcast, such as through LTE system information, a chosen DRX cycle pattern to LTE-U cells 160.

Figure 8A:
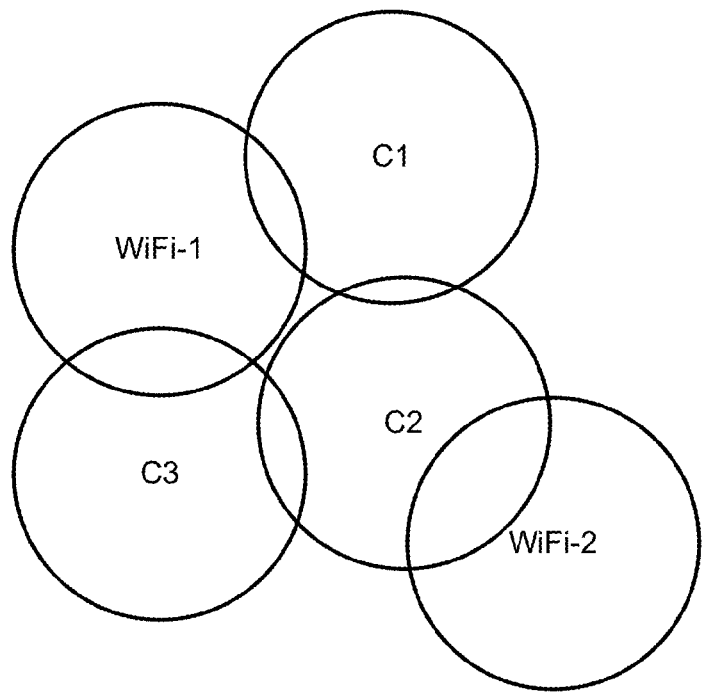
FIGS. 8A and 8B are diagrams illustrating an example of interaction between WiFi APs and LTE-U small cells.
Figure 8B:
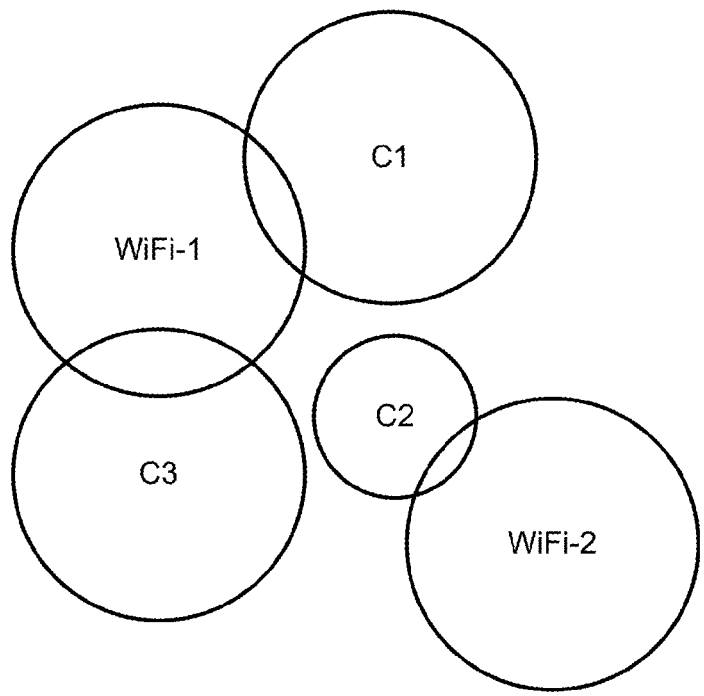

FIGS. 8A and 8B are diagrams illustrating an example of interaction between WiFi APs and LTE-U small cells. Three LTE-U small cells, labeled as cells "C1," "C2," and "C3," are illustrated. Coverage ranges associated with two WiFi APs, labeled as "WiFi-1" and "WiFi-2" are also illustrated. In FIG. 8A, WiFi-1 has overlapping coverage, which may cause interference, with C1 and C3. C2 has overlapping coverage with C1, C3, and WiFi-2.

In FIG. 8A, assume Rx measurement component 236, at C1, can measure WiFi-1 and C2; Rx measurement component 236, at C2, can measure WiFi-2, C1, and C3; and Rx measurement component 236, at C3, can measure WiFi-1 and C2. In response to the output of the measurement component, the illustrated small cells may make adjustments to accommodate the interference. For example, C1 and C3 may begin using a DRX cycle, or increase the period of a current DRX cycle, to accommodate WiFi-1. Alternatively or additionally, C2 may begin using a DRX cycle, or increase the period of a current DRX cycle, to accommodate WiFi-2. Still further, C2 may detach itself from C1 and C3, such as by reducing the cell size of C3 by reducing the transmit (Tx) power in the unlicensed frequency bands.

FIG. 8B illustrates an example of the cell interference, as shown in FIG. 8A, after C3 has reduced the transmit power. As shown, the cell size of C3 is reduced, potentially limiting interference with C1 and C3, and decreasing interference with WiFi-2.

Figure 9:
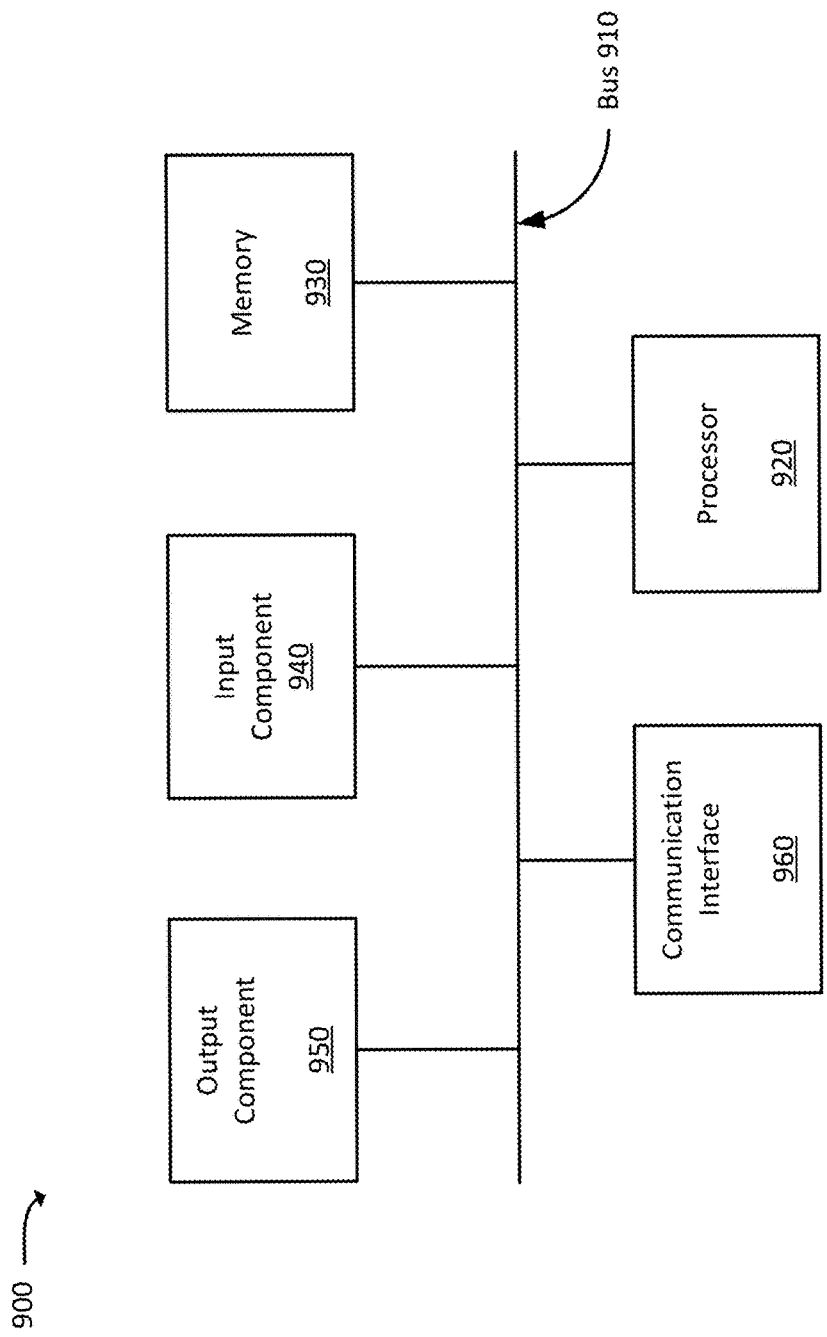
FIG. 9 is a diagram of example components of a device.

FIG. 9 is a diagram of example components of a device 900. One or more of the devices described above (e.g., as described with respect to FIGS. 1 and/or 2) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may include processing circuitry to interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, a Wi-Fi radio, a cellular radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 920 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIG. 4, the order of the blocks may be modified in other implementations. Further, non-dependent blocks may be performed in parallel. In some implementations, additional blocks may be performed before, after, or in between the described blocks.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A Long Term Evolution Unlicensed (LTE-U) device comprising:
   a first radio to implement a first wireless interface with User Equipment (UE) using licensed frequency spectrum;
   a second radio to implement a second wireless interface with the UE using unlicensed frequency spectrum; and
   processing circuitry to:
      measure signal strengths of signals received over the unlicensed frequency spectrum,
      decode LTE Master Information Blocks (MIBs) that are broadcast in the unlicensed frequency spectrum,
      receive, from the UE, a report including, for a particular frequency block among a plurality of possible frequency blocks of the unlicensed frequency spectrum, a value indicating a historical usage of the particular frequency block, as measured by the UE,
      select a frequency block, from among the plurality of possible frequency blocks in the unlicensed frequency spectrum, based on the measured signal strengths, the decoded MIBs, and the report including the value indicating the historical usage of the particular frequency block, and
      initiate communications via the selected frequency block by transmitting, using the second radio, a MIB that includes a token identifier field that is set to a particular integer value that identifies the selected frequency block.

2. The LTE-U device of claim 1, wherein the processing circuitry is further to:
   determine, based on Quality of Service (QoS) factors relating to an application type associated with the selected frequency block, a release time period for the selected frequency block; and
   cease communications, via the selected frequency block, after the release time period has elapsed relative to the initiation of the communications via the selected frequency block.

3. The LTE-U device of claim 1, wherein the token identifier is represented via a multi-bit field in the MIB.

4. The LTE-U device of claim 1, wherein, when selecting the frequency block, the processing circuitry is further to:
   select the frequency block as a frequency block for which a MIB is not detected and for which the determined signal strengths are minimized.

5. The LTE-U device of claim 1, wherein the processing circuitry is further to:
   adjust, based on the measured signal strengths, the transmit power, of the second radio interface, to reduce interference with nearby WiFi access points.

6. The LTE-U device of claim 1, wherein the report further includes token identifiers that were received by the UE from other LTE-U devices, and wherein the selection of the frequency block is further based on the token identifiers included in the report.

7. The LTE-U device of claim 1, wherein the processing circuitry is further to:
   configure the UE to transmit assistance information, to the LTE-U device, to assist in the selection of the frequency block, the assistance information including one or both of:
      signal strengths measured by the UE; or
      token identifiers received by the UE.

8. The LTE-U device of claim 7, wherein the configuration of the UE is performed via communications using the licensed frequency spectrum.

9. A method comprising:
   measuring, by a Long Term Evolution Unlicensed (LTE-U) device, signal strengths of signals received over an unlicensed frequency spectrum;

decoding, by the LTE-U device, LTE Master Information Blocks (MIBs) that are broadcast, by other LTE-U devices, in the unlicensed frequency spectrum;

receiving, from User Equipment (UE), a report including, for a particular frequency block among a plurality of possible frequency blocks of the unlicensed frequency spectrum, a value indicating a historical usage of the particular frequency block, as measured by the UE, selecting, by the LTE-U device, a frequency block from among the plurality of possible frequency blocks, in the unlicensed frequency spectrum, based on the determined signal strengths, the decoded MIBs, and the report including the value indicating the historical usage of the particular frequency block; and initiating, by the LTE-U device, communications via the selected frequency block by transmitting, using the unlicensed frequency spectrum, a MIB that includes a token identifier field that is set to a particular integer value that identifies the selected frequency block from among a plurality of possible frequency blocks in the unlicensed frequency spectrum.

10. The method of claim 9, wherein the method further comprises:

determining, based on Quality of Service (QoS) factors relating to an application type associated with the selected frequency block, a release time period for the selected frequency block; and ceasing communications, via the selected frequency block, after the release time period has elapsed relative to the initiation of the communications via the selected frequency block.

11. The method of claim 9, wherein the token identifier is represented via a multi-bit field in the MIB.

12. The method of claim 9, wherein, when selecting the frequency block further comprises:

selecting the frequency block as a frequency block for which a MIB is not detected and for which the determined signal strengths are minimized.

13. The method of claim 9, further comprising:

adjusting, based on the measured signal strengths, the transmit power of a radio interface that operates in a licensed frequency spectrum, to reduce interference with nearby WiFi access points.

14. The method of claim 9, wherein the report further includes token identifiers that were received by the UE from other LTE-U devices, and wherein the selection of the frequency block is further based on the token identifiers included in the report.

15. The method of claim 9, further comprising:

configuring a User Equipment (UE) to transmit assistance information, to the LTE-U device, to assist in the selection of the frequency block, the assistance information including one or both of:

signal strengths measured by the UE; or token identifiers received by the UE.

16. The method of claim 15, wherein the configuration of the UE is performed via communications using licensed frequency spectrum.

17. A Long Term Evolution Unlicensed (LTE-U) device comprising:

a first radio to implement a first wireless interface with User Equipment (UE) using licensed frequency spectrum;

a second radio to implement a second wireless interface with the UE using unlicensed frequency spectrum; and processing circuitry to:

decode received LTE-U signaling, in the unlicensed frequency spectrum, to determine frequency blocks in which other LTE-U devices are operating;

receive, from User Equipment (UE), a report including, for a particular frequency block of the frequency blocks in the unlicensed frequency spectrum, a value indicating a historical usage of the particular frequency block, as measured by the UE, select a frequency block, in the unlicensed frequency spectrum, based on the determination of the frequency blocks in which the other LTE-U devices are operating and based on the report;

select, based on a desired Quality of Service (QoS) for the selected frequency block, a release time period for the selected frequency block;

initiate communications, via the selected frequency block, by broadcasting, using the second radio interface, an identifier of the selected frequency block, the identifier including a value that identifies the selected frequency block from among a plurality of possible frequency blocks in the unlicensed frequency spectrum; and ceasing communications, via the selected frequency block, after the release time period has elapsed relative to the initiation of the communications.

18. The LTE-U device of claim 17, wherein the receive measurement component is further to:

determine signal strengths of signals received over the unlicensed frequency spectrum, wherein the selection of the frequency block is additionally performed based on the determined signal strengths.

19. The LTE-U device of claim 17, wherein the processing circuitry is further to:

configure the UE to transmit assistance information, to the LTE-U device, to assist in the selection of the frequency block, the assistance information including one or both of:

signal strengths measured by the UE; or frequency block identifiers received by the UE.

20. The LTE-U device of claim 17, wherein the report further includes token identifiers that were received by the UE from other LTE-U devices, and wherein the selection of the frequency block is further based on the token identifiers included in the report.

* * * * *